Sept. 2, 1958 J. M. NAUL 2,850,653
MINIATURE D. C. MOTOR
Filed Nov. 23, 1955 3 Sheets-Sheet 1
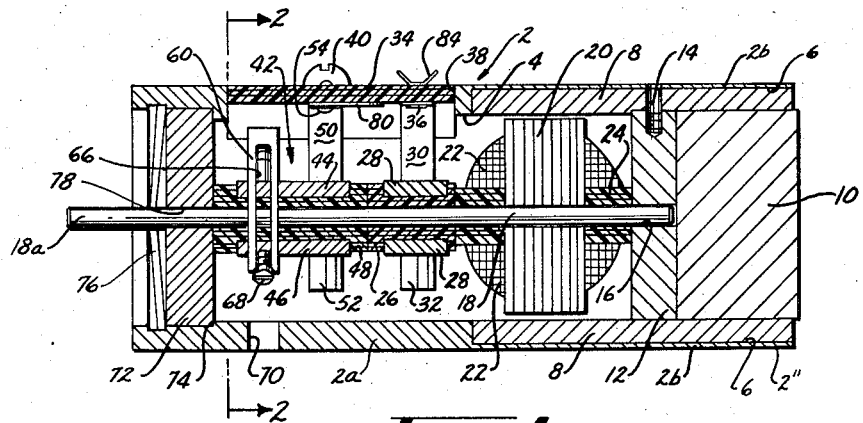
INVENTOR.
JAMES M. NAUL
BY
James and Franklin
ATTORNEYS Sept. 2, 1958          J. M. NAUL          2,850,653
MINIATURE D. C. MOTOR
Filed Nov. 23, 1955          3 Sheets-Sheet 2
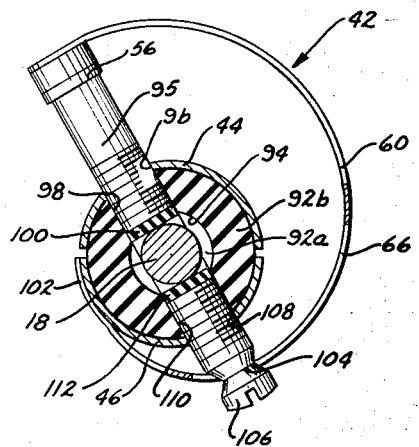
FIG. 7
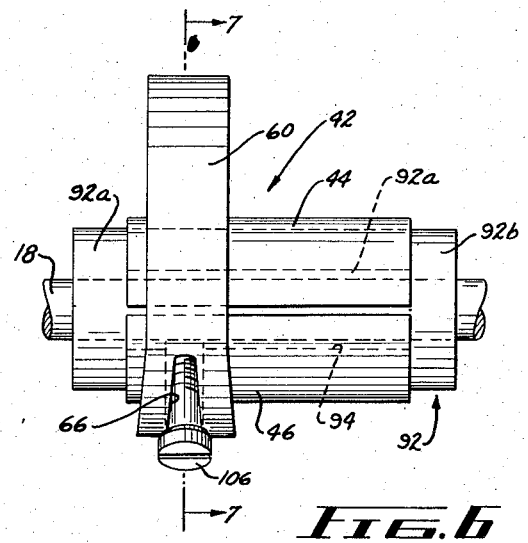
FIG. 6
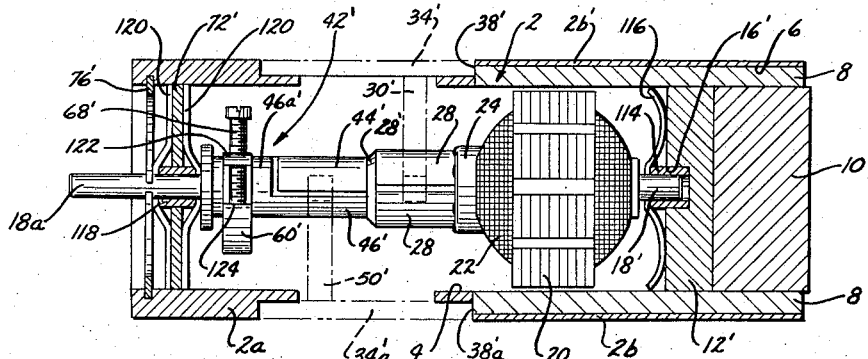
FIG. 8
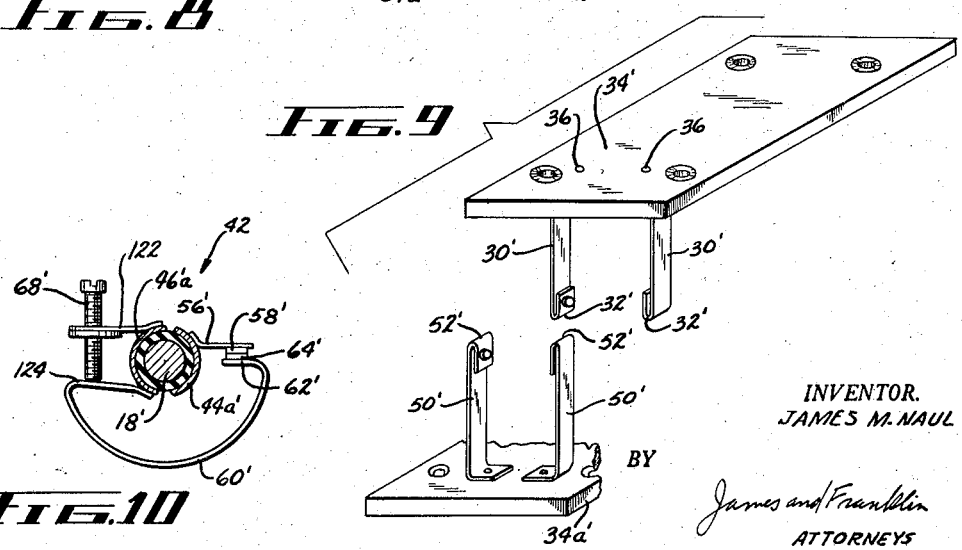
FIG. 9
FIG. 10
INVENTOR.
JAMES M. NAUL
BY
James and Franklin
ATTORNEYS Sept. 2, 1958  J. M. NAUL  2,850,653
MINIATURE D. C. MOTOR
Filed Nov. 23, 1955  3 Sheets-Sheet 3

INVENTOR.
JAMES M. NAUL
BY
James and Franklin
ATTORNEYS

United States Patent Office 2,850,653
Patented Sept. 2, 1958

2,850,653

MINIATURE D. C. MOTOR

James M. Naul, Plainfield, N. J., assignor to Eastern Air Devices, Inc., Dover, N. H., a corporation of New York Application November 23, 1955, Serial No. 548,626

14 Claims. (Cl. 310—68)

The present invention relates to a novel and advantageous construction for a D. C. motor or the like, and particularly one provided with permanent magnet excitation. The construction is especially adapted for the production of such motors which are of exceedingly small size.

D. C. motors provided with permanent magnet excitation are well known. One of the major problems involved in their design revolves about the magnetic circuit for the stator. The mounting and location of the commutator and the brushes which engage the commutator must be carried out in such a way as not to adversely affect the magnetic circuit. This in the past has been thought to require fairly complicated and expensive structure. In addition, the mounting of the permanent magnet within the stator frame while at the same time permitting the shaft of the rotor to extend out beyond the motor has also presented appreciable design problems. Generally these problems have been solved in the past by utilizing a fairly conventional motor structure in which elements are applied to each end of the stator frame which serve no function other than as end caps, thus making for a heavy and bulky unit. In some prior designs the rotor shaft is caused to pass through the permanent magnet or between the permanent magnet segments, thus disrupting the magnetic field and making for a complex assembly problem.

When, as is often the case, it is desired that the motor be of constant speed, a governor is usually incorporated into the motor. One known type of governor is that in which centrifugal force determined by the speed of rotor rotation causes a pair of contacts in series with the rotor winding to open when the rotor exceeds a given speed. When this type of governor is incorporated into a motor of the type under discussion an appreciable increase in size, weight and cost results.

The present invention features an exceptionally simple and easily assembled arrangement of parts by means of which the motor may be made much smaller and lighter than has heretofor been thought possible without any sacrifice in operating characteristics. Indeed, because the construction of the present invention provides for an extremely efficient permanent magnet circuit for the motor stator, and because the rotor shaft does not pass through the permanent magnet itself, the operating characteristics of the motor of the present invention are usually superior to those of more conventional motors.

A novel type of centrifugally operated governor is employed which has utility in and of itself even when employed in other motor constructions. It is particularly well adapted, however, for use in the basic motor structure here under discussion and cooperates with the other elements thereof to the attainment of the objectives above set forth.

The stator frame of the motor construction of the present invention comprises a generally tubular shell having a longitudinally extending open-ended chamber therein. One end of the chamber is closed by the permanent magnet, and magnetic pole shoes extend from the permanent magnet inside the chamber, the motor rotor being mounted for rotation between those shoes. The rotor shaft, at its end adjacent the permanent magnet, is journalled for rotation without having to pass through the permanent magnet. The other end of the rotor shaft, the output end thereof, is journalled for rotation in and passes through a member which closes the corresponding end of the casing. Thus the output end of the rotor shaft extends out from the casing at the end thereof opposite that at which the permanent magnet is located. The rotor shaft carries commutator segments electrically connected to the rotor windings, and brushes of novel design are mounted on the casing so as to engage those segments. The commutator and its brushes are so positioned as to be outside the stator magnetic field, preferably being located beyond the tips of the pole shoes on the side of the rotor opposite the permanent magnet. When, as is here disclosed, a governor is employed, it is positioned similarly to the commutator, and preferably adjacent thereto, so that the governor structure does not complicate the stator magnetic circuit. The individual parts are readily manufactured to reasonable dimensional tolerances, and they may be readily assembled and disassembled.

The governor features the use, as the element sensitive to the speed of rotation of the rotor, of a spring strip extending at least partially around the rotor shaft and spaced therefrom, that spring strip carrying a movable contact which is resiliently urged by the spring strip into engagement with a fixed contact also carried by the rotor shaft. The position of the fixed contact may be adjustable in order to vary the speed of operation of the motor. In addition, means such as a screw may be operatively connected between the spring strip and the rotor shaft so as to vary the force with which the spring strip urges the movable contact into engagement with the fixed contact, thus additionally or alternatively providing for adjustment of the speed of operation of the motor. The motor casing may be apertured in line with the screw or similar device so that the motor speed may be adjusted from the exterior of the casing. Because of the location of the commutator this aperture does not in any way affect the stator magnetic circuit. The fixed and movable contacts of the governor are electrically connected to additional commutator segments and additional brushes are provided engageable therewith. One of the governor brushes may be connected within the casing to one of the commutator brushes, the other governor brush and the other commutator brush being provided with terminals by means of which electrical connection to the energizing source of power may be made.

To the accomplishment of the above, and to such other objects as may hereinafter appear, the present invention relates to the arrangement and construction of the parts of the motor and governor, as defined in the appended claims and as described in this specification, taken together with the accompanying drawings, in which:

Fig. 1 is a cross-sectional view of one embodiment of the present invention taken along the line 1—1 of Fig. 3;

Fig. 2 is a cross-sectional view thereof taken along the line 2—2 of Fig. 1;

Fig. 3 is an end elevational view thereof taken from the right hand end of Fig. 1;

Fig. 4 is a top plan view thereof;

Fig. 5 is a schematic representation of the electric circuit involved;

Fig. 6 is a side elevational view of an alternative embodiment of the governor;

Fig. 7 is a cross-sectional view taken along the line 7—7 of Fig. 6;

Fig. 8 is a cross-sectional view of an alternative embodiment of the motor of the instant invention;

Fig. 9 is an exploded perspective view of the brushes and brush mounting structures of the embodiment of Fig. 8;

Fig. 10 is a front elevational view of the governor in the embodiment of Fig. 8;

Figure 11:
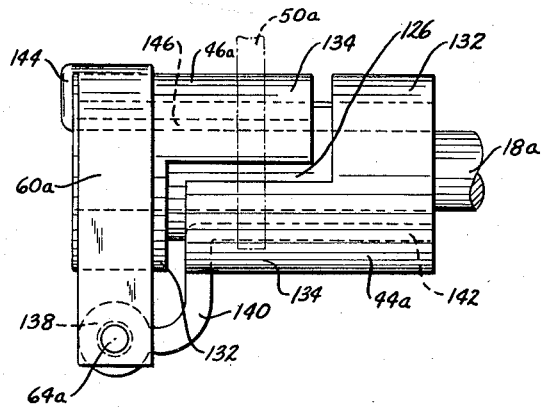
Fig. 11 is a side elevational view of yet another governor embodiment.

Having reference first to the embodiments of Figs. 1–4, the motor comprises a stator casing generally designated 2 having a longitudinally extending chamber 4 therein which is open at both ends thereof. The casing 2 may be formed of a single piece of non-magnetic material such as aluminum, or it may comprise a main section 2a and a separate shell section 2b which constitutes an axial extension of the main section 2a and is secured thereto in any appropriate manner, as by welding. Diametrically opposed portions of the inner wall of the chamber 4 are recessed, at 6, and pole shoes 8 of appropriate magnetic material are secured in place therein in any appropriate manner. Snugly fitting within the right hand open end of the chamber 4 so as to close that opening is a permanent magnet 10, that magnet being so rotatively oriented that the magnetic poles thereon, designated N and S, as is conventional, register with and engage the respective pole shoes 8. The permanent magnet 10 may be retained in place in any appropriate manner, but it is preferred that it be a press fit between the portions 2' of the casing 2 (see Fig. 3) and that it tightly clamp the right hand ends of the pole shoes 8 between itself and the portions 2" of the casing, thus serving to retain the pole shoes 8 in place. A piece 12 of non-magnetic material is positioned within the chamber 4 against the inner end of the permanent magnet 10, held in place by means of the screw 14, that piece being provided with an axial aperture 16 within which one end of the rotor shaft 18 is journalled for rotation.

Those portions of the pole shoes 8 which extend into the chamber 4 to the left beyond the permanent magnet 10 and the piece 12 define the stator poles of the motor. A conventional rotor 20 is mounted on the shaft 18 so as to be rotatable between the pole portions of the shoes 8, and appropriate electrical windings 22 are provided on the motor. The rotor 20 is secured to the rotor shaft 18 in any appropriate manner, and the windings 22 are insulated from the shaft by means of insulation 24.

As may clearly be seen from Fig. 1, the casing 2 extends to the left of the rotor 20 for an appreciable distance, as does the rotor shaft 18. Mounted on the shaft 18 to the left of the rotor 20, and insulated from the shaft 18 by means of insulation 26, are a pair of commutator segments 28 electrically connected to opposite ends of the rotor winding 22. Electrical connection with the commutator segments 28 is made by means of brushes 30, here shown in the form of thin and resiliently flexible strips of conductive metal the segment-engaging lower ends of which are reversely bent at 32. The upper ends of the brushes 30 are secured to a brush mounting panel 34 of insulating material, as by means of rivets or eyelets 36, the brush mounting panel 34 being received within an aperture 38 in the casing portion 2a and removably held in place by means of screws 40.

Mounted within the chamber 4 next to the commutator segments 38 is a centrifugal governor generally designated 42. It comprises a pair of conductive segments 44 and 46 mounted on the rotor shaft 18 but spaced and insulated therefrom by the insulation 48. Brushes 50 similar in construction to the brushes 30 and having their lower tips bent up at 52 are mounted on the panel 34 by means of eyelets or the like 54 so as to engage the segments 44 and 46. Mounted on the segment 44 is a radially extending conductive strip 56 which carries a fixed contact 58. A resilient strip 60 of conductive material has one end secured to the segment 46. The body of the strip 60 extends somewhat spirally around the segments 46 and 44, the tip 62 of the strip 60 overlying the fixed contact 58 and carrying a cooperating and movable contact 64. The strip 60, because of its resiliency, will tend to urge the movable contact 64 into engagement with the fixed contact 58. This contact and strip arrangement, it will be seen, constitutes an electrical connection between the segments 44 and 46 so long as the contacts 58 and 64 are engaged. A portion of the spring strip 60 radially spaced from the segment 46 is provided with a slot 66, and a screw 68 passes through the slot 66 and is threaded into the segment 46. The head of the screw 68 is radially outside and is adapted to engage the strip 60. Hence the degree to which the screw 68 is screwed into the segment 46 will determine the force with which the strip 60 will urge the contact 64 into engagement with the contact 58. The greater that force, the more rapidly must the rotor rotate before centrifugal force will cause the movable contact 64 to separate from the fixed contact 58. Thus adjustment of the screw 68 will vary the speed of operation of the motor in accordance with known principles. In order to permit this adjustment to be made from the outside of the casing 2 without requiring disassembly of any part of the motor, the casing portion 2a is provided with an aperture 70 in line with the screw 68, through which aperture a screw driver may be inserted for adjustment of the screw 68. It will be noted that this aperture 70, as well as the aperture 38 in which the brush mounting panel 34 is positioned, are both formed in non-magnetic portions of the casing 2 and do not in any way affect the magnetic circuit of the stator.

The left hand end of the chamber 4 in the casing 2 is closed by means of a plate 72 which fits against a shoulder 74 formed in the casing portion 2a, the plate 72 being retained in position by means of a spring washer 76 or the like. The plate 72 is provided with an aperture 78 within which the left hand end of the rotor 18 is journalled and through which that shaft extends, the outwardly projecting end 18a thereof being accessible for connection to whatever mechanism is to be driven by the motor.

The brush mounting panel 34 carries, preferably on the interior thereof, a conductive lead 80 which connects one of the brushes 50 and one of the brushes 30. Terminals 82 and 84 are mounted on the exposed surface of the panel 34 and are electrically connected respectively to the other one of the brushes 50 and the other one of the brushes 30. The resulting electric circuit is schematically indicated in Fig. 5, 86 representing the source of external D. C. energization, 88 representing a resistor connected across the governor contacts 58 and 64, and 90 representing a capacitor in shunt with the resistor 88 in order to reduce sparking, as is conventional. Tracing the rotor circuit, current may flow from the external source 86 through the terminal 82 and the corresponding brush 50 to the governor 42. So long as the governor contacts 58 and 64 remain engaged the circuit may be traced to the other brush 50, and along the lead 80 to one of the brushes 30, the resistor 88 being short-circuited. From there the current will pass through the rotor winding 32 via the commutator segments 28, and will return to the voltage source 86 through the other brush 30 and the terminal 84 which is connected thereto. When, however, the governor contacts 58 are separated, as will occur when the rotor exceeds a certain speed of rotation, the circuit to the commutator segments 28 and hence to the rotor winding 32 will be completed only through the resistor 88, the motor current will be reduced, and the rotor speed will decrease.

The advantage of the instant construction will in the main be apparent from the above description. The stator unit, comprising the casing 2, the permanent magnet 10, the pole shoes 8, and the piece 12 is formed of elements which may be simply and inexpensively fabricated and the assembly of which presents no appreciable problem. The magnetic circuit is simple and uninterrupted, except for the screw 14 which could be formed of magnetic material in order to minimize any distortion which might result in the magnetic circuit. The permanent magnet 10 is unaffected by the rotor 20 and the rotor shaft 18. The rotor unit, including the governor 42, when once assembled, may be inserted into the casing 2 from the open left hand end thereof, and may then be held in place by the piece 72, which may be readily inserted and just as readily removed when disassembly or repair of the motor is indicated. The brushes 30 and 50 are unitary with the mounting panel 34 and may be inserted or removed whenever desired, and without in any way interfering with or affecting the magnetic circuit of the stator. In addition their construction ensures proper electrical contact with minimum friction. The governor 42 may be adjusted to provide for rotor rotation at different speeds without having to disassemble the motor and, since it is located at the end of the rotor opposite from the stator magnetic circuit, the means permitting governor adjustment does not affect that magnetic circuit. Only a minimal number of parts are employed, and most of them are smaller and lighter than the corresponding parts in prior art designs. This, coupled with the overall arrangements of the parts, results in a motor of minimal size and weight but with excellent operating characteristics.

Figs. 6 and 7 represent a modification of the governor 42. There the motor shaft 18 has a body 92 of insulating material fixed thereto. The ends 92a grip the shaft 18 and the body portion 92b thereof has a central axial aperture 94 with a diameter greater than that of the shaft 18. The governor conductive segments 44 and 46 are mounted on the body portion 92b. The fixed contact 56 of the governor is defined by the head of a screw 95 which is threaded into apertures 96 and 98 formed respectively in the segment 44 and the portion 92b. A compressible insulating washer 100 is received between the radially inner tip of the screw 95 and the shaft 18. By adjusting the screw 95 the position of the fixed contact surface 56 may be varied, thus varying the speed of operation of the motor. The spring strip 60 is secured at 102 to the segment 46, as by welding or brazing, and the slot 66 thereof engages the narrowed portion 104 of the screw 106 which is threadedly received in apertures 108 and 110 formed respectively in the segment 46 and the body portion 92b, a compressible insulating washer 112 being received between the radially inner tip of the screw 106 and the shaft 118.

The embodiment of Figs. 8–10 discloses an alternative embodiment of the motor of Fig. 1 with yet another governor design. The following differences may be pointed out when compared with the embodiment of Fig. 1, similar but primed reference numerals being employed wherever appropriate for parts corresponding to but specifically different from those of the embodiment of Fig. 1. The aperture 16' in the non-magnetic piece 12' does not extend all the way therethrough, and a bushing 114 is received therein within which the right hand end of the shaft 18' is journalled. A spring clip 116 may be employed to retain the bushing 114 in position. At the left hand end of the casing 2' a piece 72' carries a bushing 118 within which the left hand end of the rotor shaft 18' is journalled, retaining elements 120 serving to hold the bushing 118 in position and a spring washer 76' being employed to maintain the various parts of the motor in assembled condition. The commutator segments 28 are formed on a portion of the rotor 28' which is of enlarged diameter when compared to that portion of the rotor on which the governor 42' is mounted. The governor segments 44' and 46' have angularly and axially displaced extensions (of which only extension 46a' of segment 46' is visible in Fig. 8), on which extensions the operative portions of the governor are mounted. The fixed contact 58' is mounted on leaf 56' which extends out radially from the extension 44a'. An arm 122 extends outwardly from the segment extension 46a', and the screw 68' is threaded thereinto. The spring strip 60' the end 62' of which carries the movable contact 64' is secured at its other end to the segment extension 46a' and has a portion 124 which extends past and is engaged by the screw 68'. Thus adjustment of the screw 68' will vary the force with which the contact 62' is urged against the contact 58'. In this particular embodiment the brushes 30' which engage the commutator segments 28' are carried by a mounting plate 34' mounted in aperture 38' at the top of the motor, while the brushes 50' which engage with the governor segments 44' and 46' are carried by mounting plate 34a' receivable in aperture 38a' at the bottom of the motor.

Figure 12:
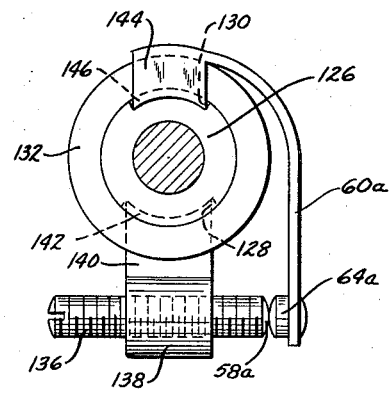
Fig. 12 is an end elevational view of the governor of Fig. 11.
Figure 14:
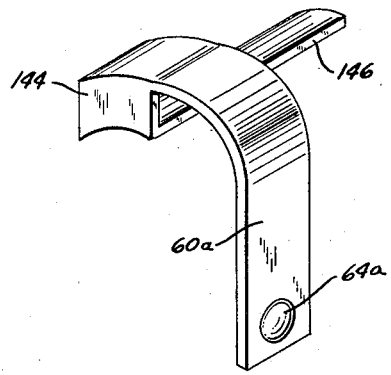
Fig. 14 is a three-quarter perspective view of the resilient strip of the governor of Fig. 11, together with the supporting structure therefor.
Figure 13:
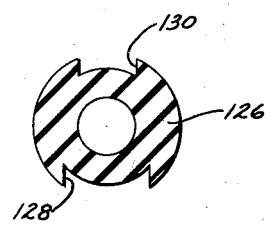
Fig. 13 is a cross-sectional view of the central supporting member for the governor of Fig. 11.

Figs. 11–14 disclose yet another embodiment of a centrifugal governor particularly adapted for use in the motor of the type under discussion. There an insulating sleeve 126 is mounted on the shaft 18a, the outer periphery of the sleeve 126 being provided with recesses 128 and 130. The conductive governor segments 44a and 46a are formed of pieces of conductive material such as copper each comprising a ring portion 132 which fits snugly over the outside of the sleeve 126 and an axially extending portion 134 which extends only partway around the sleeve 126 and which defines the segments proper 44a and 46a which are adapted to be engaged by the brushes 50a. As may best be seen from Fig. 11, the two copper pieces are oppositely oriented so that their ring portions 132 are at opposite ends of the assembly. The fixed governor contact 58a is defined by a screw 136 threadedly received within a curled portion 138 of a piece which also includes an arm 140 and an arcuate finger 142 snugly received in the notch 128 of the sleeve 126 inside the ring portion 134 of the segment 44a. The movable contact 64a which is urged into engagement with the fixed contact 58a is carried at the end of spring arm 60a which is integrally connected by means of portion 144 with finger 146 snugly received within the notch 130 in the sleeve 126 inside the ring portion 132 of the segment 46a. In this particular governor embodiment variation in the speed of operation of the motor can be accomplished solely by adjusting the screw 136 and thus varying the position of the fixed contact 58a.

While but a limited number of embodiments of the present invention have been here disclosed, it will be apparent that many variations may be made therein, all within the spirit of the invention as defined in the following claims.

I claim:

1. A motor comprising a casing having a longitudinally extending chamber therein, a magnet at one end of said chamber, pole shoes extending longitudinally from said magnet along sides of said chamber, a rotor in said chamber between said pole shoes, a winding on said rotor, a part extending longitudinally from said rotor and carrying commutator segments electrically connected to said winding, a first set of brushes mounted on said casing, projecting into said chamber, and engaging said commutator segments, a second pair of commutator segments on said rotor part axially separated from said first mentioned segments, a centrifugal circuit breaking governor on said rotor and connecting said segments, a second set of brushes carried by said casing and engaging said second pair of segments, an electrical connection between one brush of said first set and one brush of said second set, and terminals electrically connected to the other brushes of each set, said governor comprising a fixed contact radially spaced from and electrically connected to one segment of said second pair of segments, and a spring strip electrically connected to said other segment of said second pair of segments and extending around and radially spaced from said rotor, said spring strip carrying a movable contact overlying said fixed contact and resiliently urged thereagainst by said spring strip.

2. A motor comprising a casing having a longitudinally extending chamber therein, a magnet at one end of said chamber, pole shoes extending longitudinally from said magnet along sides of said chamber, a rotor in said chamber between said pole shoes, a winding on said rotor, a part extending longitudinally from said rotor and carrying commutator segments electrically connected to said winding, a first set of brushes mounted on said casing, projecting into said chamber, and engaging said commutator segments, a second pair of commutator segments on said rotor part axially separated from said first mentioned segments, a centrifugal circuit breaking governor on said rotor and connecting said segments, a second set of brushes carried by said casing and engaging said second pair of segments, an electrical connection between one brush of said first set and one brush of said second set, and terminals electrically connected to the other brushes of each set, said governor comprising a fixed contact radially spaced from and electrically connected to one segment of said second pair of segments, and a spring strip electrically connected to said other segment of said second pair of segments and extending around and radially spaced from said rotor, said spring strip carrying a movable contact overlying said fixed contact and resiliently urged thereagainst by said spring strip, and means operatively connected to said spring strip for controlling the force with which it resiliently urges said movable contact against said fixed contact, said means comprising a screw operatively connected between said rotor and a part of said spring strip radially spaced from said rotor.

3. A motor comprising a casing having a longitudinally extending chamber therein, a magnet at one end of said chamber, pole shoes extending longitudinally from said magnet along sides of said chamber, a rotor in said chamber between said pole shoes, a winding on said rotor, a part extending longitudinally from said rotor and carrying commutator segments electrically connected to said winding, a first set of brushes mounted on said casing, projecting into said chamber, and engaging said commutator segments, a second pair of commutator segments on said rotor part axially separated from said first mentioned segments, a centrifugal circuit breaking governor on said rotor and connecting said segments, a second set of brushes carried by said casing and engaging said second pair of segments, an electrical connection between one brush of said first set and one brush of said second set, and terminals electrically connected to the other brushes of each set, said governor comprising a fixed contact radially spaced from and electrically connected to one segment of said second pair of segments, and a spring strip electrically connected to said other segment of said second pair of segments and extending around and radially spaced from said rotor, said spring strip carrying a movable contact overlying said fixed contact and resiliently urged thereagainst by said spring strip, and means operatively connected to said spring strip for controlling the force with which it resiliently urges said movable contact against said fixed contact, said means comprising a screw operatively connected between said rotor and a part of said spring strip radially spaced from said rotor, said casing having an aperture in line with said screw, whereby the latter may be adjusted from the exterior of said casing.

4. A motor comprising a casing having a longitudinally extending chamber therein, a magnet at one end of said chamber, pole shoes extending longitudinally from said magnet along sides of said chamber, a rotor in said chamber between said pole shoes, a winding on said rotor, a part extending longitudinally from said rotor and carrying commutator segments electrically connected to said winding, a first set of brushes mounted on said casing, projecting into said chamber, and engaging said commutator segments, a second pair of commutator segments on said rotor part axially separated from said first mentioned segments, a centrifugal circuit breaking governor on said rotor and connecting said segments, a second set of brushes carried by said casing and engaging said second pair of segments, an electrical connection between one brush of said first set and one brush of said second set, and terminals electrically connected to the other brushes of each set, said governor comprising a fixed contact radially spaced from and electrically connected to one segment of said second pair of segments, and a spring strip electrically connected to said other segment of said said second pair of segments and extending around and radially spaced from said rotor, said spring strip carrying a movable contact overlying said fixed contact and resiliently urged thereagainst by said spring strip, and means operatively connected to said spring strip for controlling the force with which it resiliently urges said movable contact against said fixed contact, said means comprising said spring strip having an opening therethrough at a part radially spaced from said rotor, and a screw passing through said opening, threadedly engaged with said rotor, and having a headed portion outside said strip, said screw engaging said strip at said opening so as to cause said strip part to move therewith relative to said rotor.

5. A motor comprising a casing having a longitudinally extending chamber therein, a magnet at one end of said chamber, pole shoes extending longitudinally from said magnet along sides of said chamber, a rotor in said chamber between said pole shoes, a winding on said rotor, a part extending longitudinally from said rotor and carrying commutator segments electrically connected to said winding, a first set of brushes mounted on said casing, projecting into said chamber, and engaging said commutator segments, a second pair of commutator segments on said rotor part axially separated from said first mentioned segments, a centrifugal circuit breaking governor on said rotor and connecting said segments, a second set of brushes carried by said casing and engaging said second pair of segments, an electrical connection between one brush of said first set and one brush of said second set, and terminals electrically connected to the other brushes of each set, said governor comprising a fixed contact radially spaced from and electrically connected to one segment of said second pair of segments, and a spring strip electrically connected to said other segment of said second pair of segments and extending around and radially spaced from said rotor, said spring strip carrying a movable contact overlying said fixed contact and resiliently urged thereagainst by said spring strip, and means operatively connected to said spring strip for controlling the force with which it resiliently urges said movable contact against said fixed contacts, said means comprising said spring strip having an opening therethrough at a part radially spaced from said rotor, and a screw passing through said opening, threadedly engaged with said rotor, and having a headed portion outside said strip, said screw engaging said strip at said opening so as to cause said strip part to move therewith relative to said rotor, said casing having an aperture in line with said screw, whereby the latter may be adjusted from the exterior of said casing.

6. A motor comprising a casing having a longitudinally extending chamber therein, a magnet at one end of said chamber, pole shoes extending longitudinally from said magnet along sides of said chamber, a rotor in said chamber between said pole shoes, a winding on said rotor, a part extending longitudinally from said rotor and carrying commutator segments electrically connected to said winding, a first set of brushes mounted on said casing, projecting into said chamber, and engaging said commutator segments, a second pair of commutator segments on said rotor part axially separated from said first mentioned segments, a centrifugal circuit breaking governor on said rotor and connecting said segments, a second set of brushes carried by said casing and engaging said second pair of segments, an electrical connection between one brush of said first set and one brush of said second set, and terminals electrically connected to the other brushes of each set, said governor comprising a fixed contact radially spaced from and electrically connected to one segment of said second pair of segments, and a spring strip electrically connected to said other segment of said second pair of segments and extending around and radially spaced from said rotor, said spring strip carrying a movable contact overlying said fixed contact and resiliently urged thereagainst by said spring strip, said fixed contact being adjustably positionable relative to said rotor.

7. The motor of claim 6, in which said governor comprises a fixed contact radially spaced from and electrically connected to one segment of said second pair of segments, and a spring strip electrically connected to said other segment of said second pair of segments and extending around and radially spaced from said rotor, said spring strip carrying a movable contact overlying and resiliently urged against said fixed contact, and means operatively connected to said spring strip for controlling the force with which it resiliently urges said movable contact against said fixed contact, said means comprising a screw operatively connected between said rotor and a part of said spring strip radially spaced from said rotor.

8. A rotor with a centrifugal governor comprising a shaft, a pair of conductive segments carried by and insulated from said shaft and electrically separated from one another, a fixed contact assembly comprising a mounting portion secured between said shaft and one of said segments and a fixed contact portion electrically connected to said one of said segments and radially exposed relative to said shaft, and a movable contact assembly comprising a mounting portion secured between said shaft and the other of said segments and a spring strip electrically connected to said other of said segments and extending around and radially outwardly spaced from said segments to a point overlying said fixed contact portion and there carrying a movable contact portion, said movable contact portion being resiliently urged against said fixed contact portion by said spring strip.

9. In the combination of claim 8, an insulating sleeve between said shaft and said segments, said sleeve having recesses into which the mounting portions of said contact assemblies are received.

10. A rotor with a centrifugal governor comprising a shaft, a pair of conductive segments carried by and insulated from said shaft and electrically separated from one another, each of said segments comprising a ring portion surrounding said shaft and a second portion extending axially therefrom but only partially encompassing said shaft, said segments being arranged with their second portions extending toward but separated from one another and overlapping axially but not circumferentially, a fixed contact assembly comprising a mounting portion secured between said shaft and one of said segments and a fixed contact portion electrically connected to said one of said segments and radially exposed relative to said shaft, and a movable contact assembly comprising a mounting portion secured between said shaft and the other of said segments and a spring strip electrically connected to said other of said segments and extending around and radially outwardly spaced from said segments to a point overlying said fixed contact portion and there carrying a movable contact portion, said movable contact portion being resiliently urged against said fixed contact portion by said spring strip.

11. In the combination of claim 10, an insulating sleeve between said shaft and said segments, said sleeve having recesses into which the mounting portions of said contact assemblies are received.

12. A centrifugal governor adapted to be carried by a rotor and comprising a fixed contact mounted on said rotor, and a spring strip operatively connected to said rotor and extending around and radially outwardly spaced from the radially outer surface of said rotor, said spring strip carrying a movable contact which overlies said fixed contact and is resiliently urged thereagainst by said spring strip, and means operatively connected to said spring strip for controlling the force with which it resiliently urges said movable contact against said fixed contact, said means comprising said spring strip having an opening therethrough at a part thereof radially spaced outwardly from said rotor, and a screw passing through said opening, threadedly engaged with said rotor radially inside said strip, and having a headed portion outside said strip, said screw engaging said strip at said opening so as to cause said strip part to move therewith relative to said rotor.

13. A rotor with a centrifugal governor comprising a shaft, an insulating body on and surrounding said shaft and having on the outer periphery thereof a pair of separated conductive segments, a fixed contact secured to said insulating body, radially exposed thereon, and electrically connected to one of said segments, and a spring strip secured to said insulating body and electrically connected to the other of said segments, a portion of said strip extending around and radially outwardly spaced from said body and segments to a point overlying said fixed contact and there carrying a movable contact, said movable contact being resiliently urged against said fixed contact by said spring strip, and means operatively connected to said spring strip for controlling the force with which it resiliently urges said movable contact against said fixed contact, said means comprising said spring strip having an opening therethrough at a part thereof radially outwardly spaced from said body and segments, and a screw passing through said opening, threadedly engaged with one of said insulating body and said other of said segments at a point radially inside said strip, and having a headed portion outside said strip, said screw engaging said strip at said opening so as to cause said strip part to move therewith relative to said shaft.

14. A rotor with a centrifugal governor comprising a shaft, an insulating body on and surrounding said shaft and having on the outer periphery thereof a pair of separated conductive segments, a fixed contact secured to said insulating body, radially exposed thereon, and electrically connected to one of said segments, and a spring strip secured to said insulating body and electrically connected to the other of said segments, a portion of said strip extending around and radially outwardly spaced from said body and segments to a point overlying said fixed contact and there carrying a movable contact, said movable contact being resiliently urged against said fixed contact by said spring strip, and means operatively connected to said spring strip for controlling the force with which it resiliently urges said movable contact against said fixed contact, said means comprising a screw adjustably operatively connected to said insulating body and engageable with said strip at a point radially outwardly spaced from said rotor and between the parts where said strip is secured to said body and where said strip overlies said fixed contact so as to cause said strip, where it is thus engaged, to move therewith relative to said shaft.

(References on following page)

References Cited in the file of this patent

UNITED STATES PATENTS

| | | |
|---|---|---|
| 1,163,040 | Severy et al. | Dec. 7, 1915 |
| 1,390,619 | Johns | Sept. 13, 1921 |
| 1,624,775 | Bovard | Apr. 12, 1927 |
| 1,929,372 | Lansing | Oct. 3, 1933 |
| 1,994,626 | Townsend | Mar. 19, 1935 |
| 2,177,472 | Barett | Oct. 24, 1939 |
| 2,325,915 | Naul | Aug. 3, 1943 |
| 2,329,151 | Brady | Sept. 7, 1943 |
| 2,761,031 | McDonald | Aug. 28, 1956 |